United States Patent
Beyer

(10) Patent No.: US 6,295,715 B1
(45) Date of Patent: Oct. 2, 2001

(54) TENSIONING A SHAPED PART

(75) Inventor: Roland Beyer, Karlsruhe (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/615,330

(22) Filed: Jul. 12, 2000

Related U.S. Application Data

(62) Division of application No. 09/188,176, filed on Nov. 9, 1998, now Pat. No. 6,115,907.

(30) Foreign Application Priority Data

Nov. 7, 1997 (DE) ............................................. 197 49 230

(51) Int. Cl.⁷ ..................................................... B23Q 7/00
(52) U.S. Cl. ................................. 29/559; 29/721; 72/293
(58) Field of Search ................................. 29/281.1, 283, 29/559, 705, 714, 721; 269/152, 268, 269, 329; 72/422, 293

(56) References Cited

U.S. PATENT DOCUMENTS

| | | | |
|---|---|---|---|
| 4,052,047 | * | 10/1977 | Bailey ................................. 269/238 |
| 4,181,392 | * | 1/1980 | Casler et al. ....................... 339/95 R |
| 4,363,475 | * | 12/1982 | McCarty ................................ 269/69 |
| 4,658,682 | * | 4/1987 | Taijonlahti et al. ..................... 83/13 |
| 4,751,995 | * | 6/1988 | Naruse et al. ....................... 198/345 |
| 4,770,401 | * | 9/1988 | Donaldson .......................... 269/249 |
| 4,960,974 | * | 10/1990 | Shigenaka .......................... 219/137 R |
| 4,976,484 | * | 12/1990 | Nomaru et al. .................... 294/119.1 |
| 5,141,093 | * | 8/1992 | Alexander .......................... 198/345.1 |
| 5,330,168 | * | 7/1994 | Enomoto et al. .................... 269/329 |
| 5,409,158 | * | 4/1995 | Angel .................................. 228/182 |
| 5,619,784 | * | 4/1997 | Nishimoto et al. .................... 29/430 |
| 5,902,496 | * | 5/1999 | Alborante .......................... 219/86.24 |
| 6,115,907 | * | 9/2000 | Beyer .................................... 29/559 |

FOREIGN PATENT DOCUMENTS

| | | | |
|---|---|---|---|
| 36 32 477 | | 4/1988 | (DE) . |
| 42 11 736 | | 10/1992 | (DE) . |
| 692 03 928 | | 3/1996 | (DE) . |
| 0 512 576 | | 11/1992 | (EP) . |
| 2 578 464 | | 9/1986 | (FR) . |
| 2 212 421 | | 7/1989 | (GB) . |
| 2235946 | * | 3/1991 | (GB) ................................ F16B/2/06 |

\* cited by examiner

*Primary Examiner*—S. Thomas Hughes
*Assistant Examiner*—Essama Omgba
(74) *Attorney, Agent, or Firm*—Crowell & Moring, L.L.P.

(57) ABSTRACT

A method for tensioning shaped parts, with a frame and a plurality of tensioning elements which are formed by a holding part and a clamping part. The holding part abuts the shaped part pointwise and a clamping part pushes the shaped part in the direction of the surface normal against the holding part.

3 Claims, 4 Drawing Sheets

TENSIONING A SHAPED PART

This application is a division of application Ser. No. 09/188,176, filed Nov. 9, 1998, now U.S. Pat. No. 6,115,907.

BACKGROUND AND SUMMARY OF THE INVENTION

This application claims the priority of German patent 197 49 230.4-21, filed Nov. 7, 1997, the disclosure of which is expressly incorporated by reference herein.

The invention relates to a device for tensioning a shaped part, especially a body part, in a motor vehicle body-in-white, with a frame receiving the shaped part, said frame having a plurality of tensioning elements to tension the shaped part, with the tensioning element having a holding part that abuts the shaped part and a clamping element that presses the shaped part against the holding part.

Devices of this kind with tensioning elements are known in the art. Such devices are used to hold shaped parts, for example side parts of a motor vehicle body, with the shaped parts being tensioned in the device by the tensioning elements. Such tensioned shaped parts can then either be measured or machined further. In the known devices, the holding part of the tensioning element which the shaped part abuts is designed as the negative (i.e., mating) shape of the area surrounding the tensioning location, so that the shaped part can abut the holding part exactly with its tensioning location. This holding part as a rule has a three-dimensional shape and can be placed exactly on the tensioning point. In order to hold the shaped part on this holding part, the shaped part is pressed by a clamping element against the holding part on the opposite side.

Since the shaped part is held in the device not only by means of a single tensioning element but as a rule by a plurality of tensioning elements, the problem arises that the shaped part with its tensioning points does not always rest exactly against all the holding parts since the shaped part, especially if it is not resistant to bending or twisting, is firstly bent under the force of its own weight, i.e. it sags, and has intrinsic stresses and/or may come out of the previous manufacturing process already deformed. If a holding part is pressed by such a three-dimensional contact surface against the tensioning surface, as a rule the holding part does not rest flush against the shaped part, since as a rule the shaped part and/or the contact surface rests against the holding part, in all three directions in space, and under certain conditions is still twisted. If the shaped part is pressed with high force against the holding part, plastic deformations of the shaped part can occur and the shaped part can also be tensioned further so that its shape chances and may undergo further deterioration. Therefore, such holding parts are mounted on displacement carriages so that the holding parts are moved out of their specified positions by these displacement carriages and can be brought to the actual position of the part. From the displacement of the holding part, the deviation of the actual position from the specified position can be determined.

It has been found that by fine adjustment of one particular holding part and the tensioning of the corresponding shaped part, the contact of the shaped part against this holding part can be improved, but contact at all other holding parts is worsened as a rule. Readjustment of those other parts is therefore necessary, during which the contract between the shaped part and a previously adjusted holding part changes once again so that the entire tensioning process of the molded part becomes an iterative process that is very time consuming and can last up 45 minutes until the tolerance for deviation of +/−0.2 mm is obtained.

Consequently, there is a need for a device by which torsion-sensitive shaped parts can be tensioned quickly and exactly.

This and other needs have been met according to the present invention by providing a device for clamping a shaped part for motor vehicle, comprising: a frame receiving the shaped part; and a plurality of tensioning elements mounted on the frame for tensioning the shaped part, each of said tensioning elements having a holding part that abuts the shaped part and a clamping element that presses the shaped part against the holding part, wherein the holding part is designed to abut the shaped part pointwise at a contact point and engages the clamping element in a surface normal of the shaped part at said contact point, such that the shaped part is secured in only one dimension.

This and other needs have been met according to the present invention by providing an arrangement for clamping a shaped body part for a motor vehicle, comprising: a frame; a plurality of tensioning elements mounted on said frame, each of said tensioning elements having a holding part and a clamping element arranged such that said shaped part can be clamped therebetween with said clamping element pressing the shaped part against the holding part, wherein each of said holding part and said clamping element have a convex clamping surface for pointwise engagement with said shaped part.

This and other needs have been met according to the present invention by providing a method of clamping a shaped body part for a motor vehicle, said method comprising the acts of: providing a tensioning device including a frame and a plurality of tensioning elements mounted on said frame, each of said tensioning elements having a holding part and a clamping element, each of said holding part and said clamping element having a convex clamping surface for pointwise engagement with said shaped part; and clamping said shaped part between said clamping element and said holding part of each of said tensioning elements, such that said clamping element presses the shaped part against the holding part.

The pointwise contact between the holding part and the shaped part produces a one-dimensional position determination of the shaped part. If the shape part, which can have a three-dimensionally curved surface at the tensioned point, a free-form surface for example, was to be twisted for example, this makes no difference for the pointwise tensioning. In the case of flat surfaces, the shaped part can be displaced in this plane throughout without the tensioning quality at the tensioning location being negatively affected. The shaped part is held in only one dimension by the clamping element. If the clamping element must perform clamping in a second dimension, a second clamping element is required for the purpose which likewise rests pointwise on a shaped part. In addition, the pressing of the shaped part with a pressing force that runs in the surface normal direction ensures that when the shaped part is pressed against the holding part, no transverse forces and no moments will be conducted into the shaped part, so that the shaped part is neither elastically nor plastically deformed. As a result, adjacent tensioning points are not affected.

By using the devices according to the invention, shaped parts can be tensioned that consist for example of sheet metal, plastic, or organic materials as well as bonded materials.

According to the invention the clamping element has a spherical, especially a spherical-segment-shaped or doubleconical-roller shaped surface. The spherical surface permits a pointwise contact between the clamping element or holding part with the shaped part. Other non-spherical, convex surfaces are also contemplated. In a double-conical roller-shaped surface as well, there is a pointwise contact, and the part is essentially freely movable in one direction, namely the unrolling direction of the double conical roller. In this manner, stresses in the shaped part can be avoided if it is to be stored after tensioning in this unrolling direction.

In order not to damage the surface or the shape of the shaped part, especially in sensitive or thin-walled shaped parts, the shaped part is tensioned with a predetermined tensioning force via the tensioning element on the holding part. The tensioning force is therefore adjusted to the shaped part so that even extremely thin-walled parts for example can be tensioned without being deformed.

Preferably the clamping element has a clamping part that is under spring force or is driven hydraulically or pneumatically. By adjusting the spring force or by adjusting the hydraulic or pneumatic pressure, the tensioning force can be adjusted to the need. In addition, the tensioning forces can be applied reproducibly in this fashion.

In one preferred embodiment, the holding part is provided with a holding element that can be displaced in the direction of the surface normal between a resting position and a set position. This holding element, for example a cylindrical pin or the like, is subjected to the force of a mechanical, hydraulic, or pneumatic spring and is pushed into the holding part up to the set position by the tensioning of the shaped part. Then a sensor can be provided that detects the set position of the holding element in the holding part. The signal from the sensor for example is an acoustically or visually detectable optical or electrical information parameter. This can be for example a luminous electronic diode (LED) or an electrical pulse that can be used for further processes. An LED has the important advantage that the operator is informed, even while tensioning, whether or not the shaped part is in the desired set position at the preset tensioning force. With the sensor signal, the clamping part can also be held during tensioning and locked in this position. The shaped part is then likewise in the desired set position.

In order to achieve a tensioning of these shaped parts, in the case of heavy shaped parts that deform under their own weight, in the device without the shaped part being influenced by its own weight, the frame has one or more supporting elements for the shaped part to compensate for gravity. In these cases, the contact elements are located in the frame under the force of a spring. This means that the shaped part is suspended flexibly in the frame so that it can be moved out of this position slightly as before. However, the force exerted by the weight is compensated by the supporting elements, with the supporting elements exerting on the shaped part a force that counteracts the force of the weight. The spring can be an especially adjustable mechanical, hydraulic, or pneumatic spring. This has the important advantage that by adjusting the spring force, the supporting elements can be adjusted exactly to the weight of the shaped part and thus the set position of the shaped part in the device can be adjusted.

With the device according to the invention, the shaped part can be pressed against the holding part by a predetermined force and a determination can be made as to whether it is abutting the holding part. The shaped part is gauged in this manner. If the pressing force is insufficient to contact the shaped part, the shaped part is not in the set position. The holding part can then be adjusted until it abuts the shaped part, so that in this manner the deviation from the set position can be determined. The shaped part is then measured. The holding part is used in this case as a measuring tool.

A use of the device according to the invention consists in employing it in a joining process during the measurement of the shaped parts and/or during tensioning of the shaped parts. In this manner, the shaped parts can be gauged exactly, measured, or merely positioned exactly so that they will connect more precisely with other shaped parts, especially by welding. In addition, a 100% gauging or measurement of the individual parts and/or of the shaped parts connected with one another can also be performed immediately before and/or after joining, for which purpose the device according to the invention is likewise used.

Other objects, advantages and novel features of the present invention will become apparent from the following detailed description of the invention when considered in conjunction with the accompanying drawings.

DETAILED DESCRIPTION OF THE DRAWINGS

Figure 1:
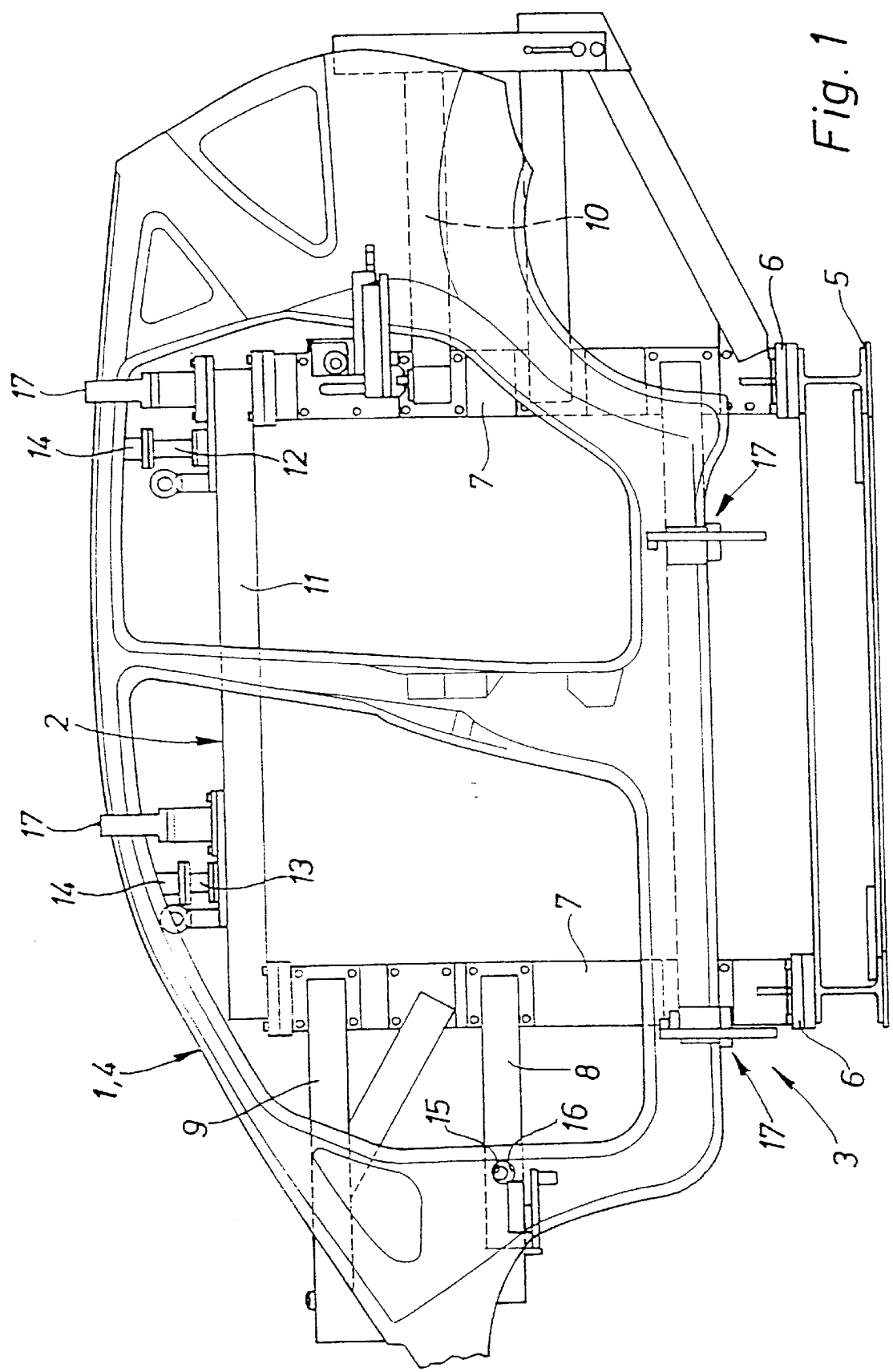
FIG. 1 is a side view of a side part of a motor vehicle body inserted into a frame, including a tensioning device according to a preferred embodiment of the present invention.

FIG. 1 shows a side inner part of a motor vehicle body labeled as a whole by 1, said part being tensioned to a frame 2 of a device 3. A side interior part 1 of this kind consists of a relatively thin-walled shaped part 4 which is very sensitive to twisting because of its limited wall thickness. Frame 2 has a base support 5 and two cross members 6 as well as a plurality of stubs 7 fastened thereto, on which arms 8, 9, and 10 are fastened. The two stubs 7 are joined together by a connecting beam 11. A frame 2 of this kind is resistant to twisting and can support both shaped part 2 and all the elements required for tensioning.

Connecting member 11 is provided with two brackets 12 and 13 that serve to accept supporting elements 14. These supporting elements 14 are mounted flexibly (i.e., movably) in the vertical direction and serve to receive shaped part 4. Another supporting element 15 is provided on arm 8 that engages opening 16 of shaped part 4 and likewise supports the latter. Shaped part 4 can be displaced slightly in the lengthwise direction on supporting element 15. Shaped part 4 is supported by supporting elements 14 and 15 and the force of gravity or the weight of shaped part 4 are accepted. Shaped part 4 accordingly exerts no forces or only insignificantly low forces caused by the weight on tensioning elements 17. Shaped part 4, as described further below, is connected with frame 2 by these tensioning elements 17.

Figure 2:
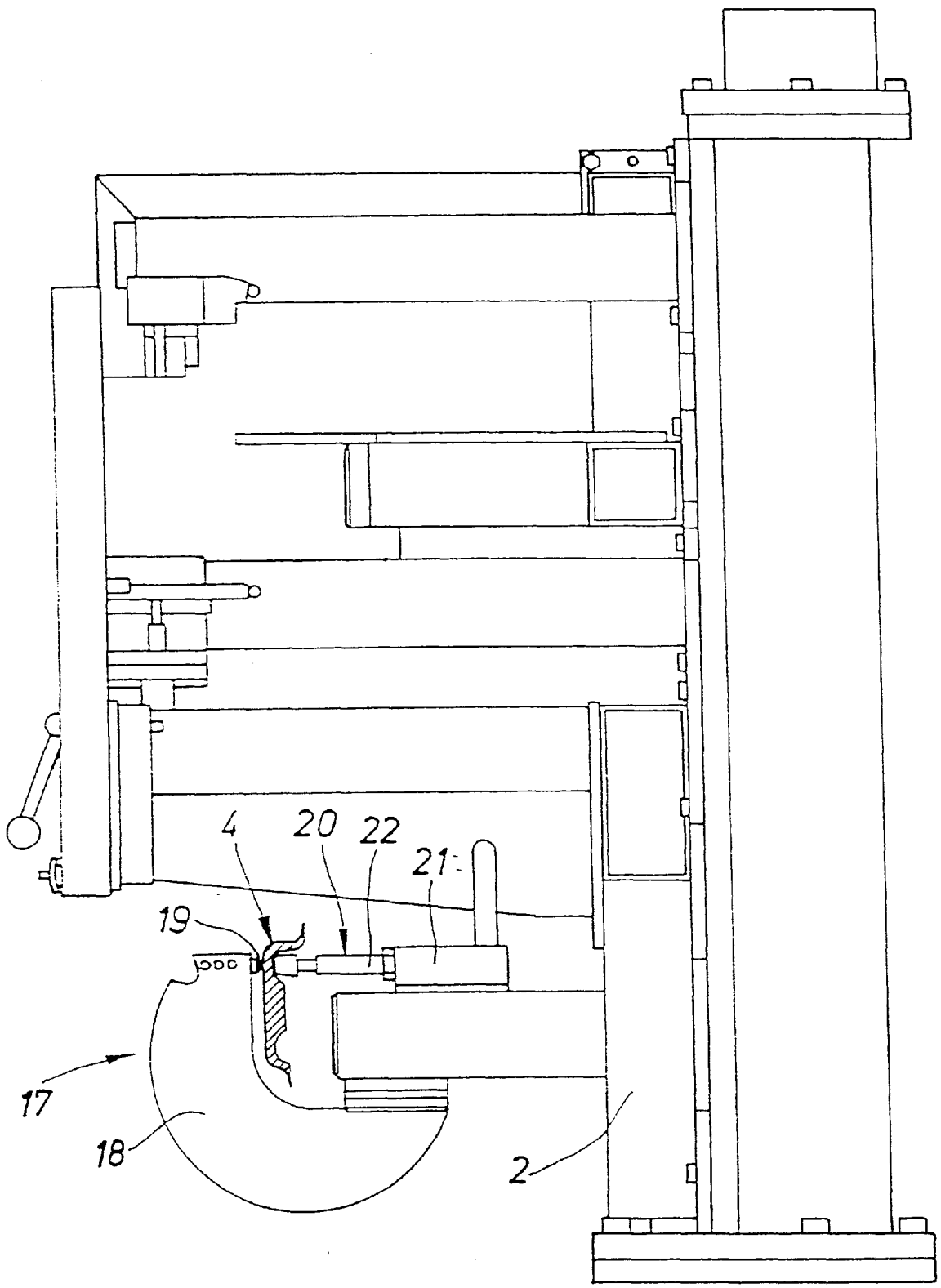
FIG. 2 is a section through a side wall of a motor vehicle body tensioned in the device according to the invention.

FIG. 2 shows a tensioning element 17 in an enlarged view, with which a shaped part 4 is tensioned. Tensioning element 17 has a relatively rigid retaining part 18 connected with frame 2 and abutting shaped part 4 pointwise. A supporting element 19 in the shape of a hemisphere serves for this purpose which is used in plane tensioning surfaces. If the tensioning surface has a spherical or convex curvature, the contact element 19 may be made flat. Opposite supporting element 19 is a clamping element 20 by which shaped part 4 is held on retaining part 18. The direction of the tensioning force is normal to the surface of shaped part 4 at the application point of supporting element 19. In this manner, shaped part 4 is tensioned free of moments and transverse forces.

Clamping element 20 is located on a carriage 21 that can be adjusted in the direction of shaped part 4. Carriage 21 contains a mechanical, hydraulic, or pneumatic spring that holds a clamping part, designed as a punch 22, of clamping element 20 in the extended position. If the pressing force exceeds a predetermined value, punch 22 moves against the action of the spring into carriage 21. The force of the spring is adjustable and is tuned to shaped part 4.

Figure 3:
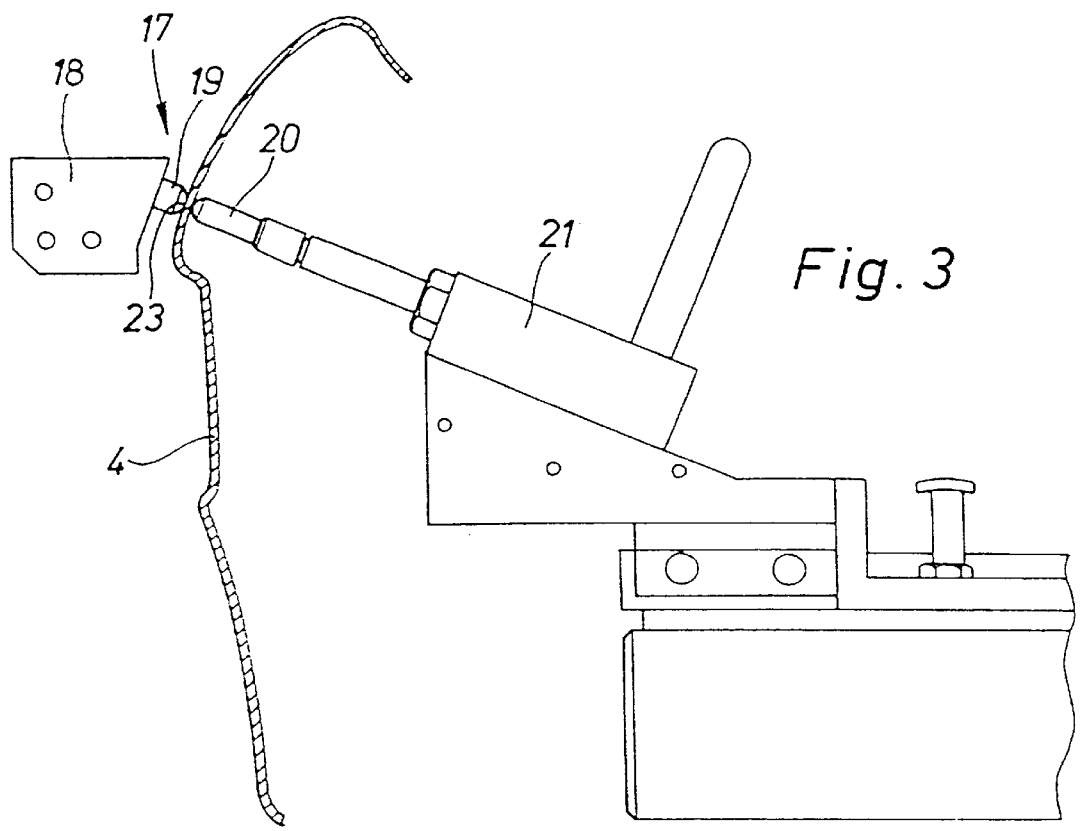
FIG. 3 is another section through a side wall of a motor vehicle body which is tensioned in the device according to the invention.

FIG. 3 shows another embodiment of a clamping element 17, with it being clearly evident in this case that carriage 21 is tilted in such fashion that clamping element 20 still exerts a clamping force on shaped part 4 normal to the surface, at contact point 23 of supporting element 19 of holding part 18. The adjustment of clamping element 20 via carriage 21 likewise takes place in this surface normal.

Figure 4:
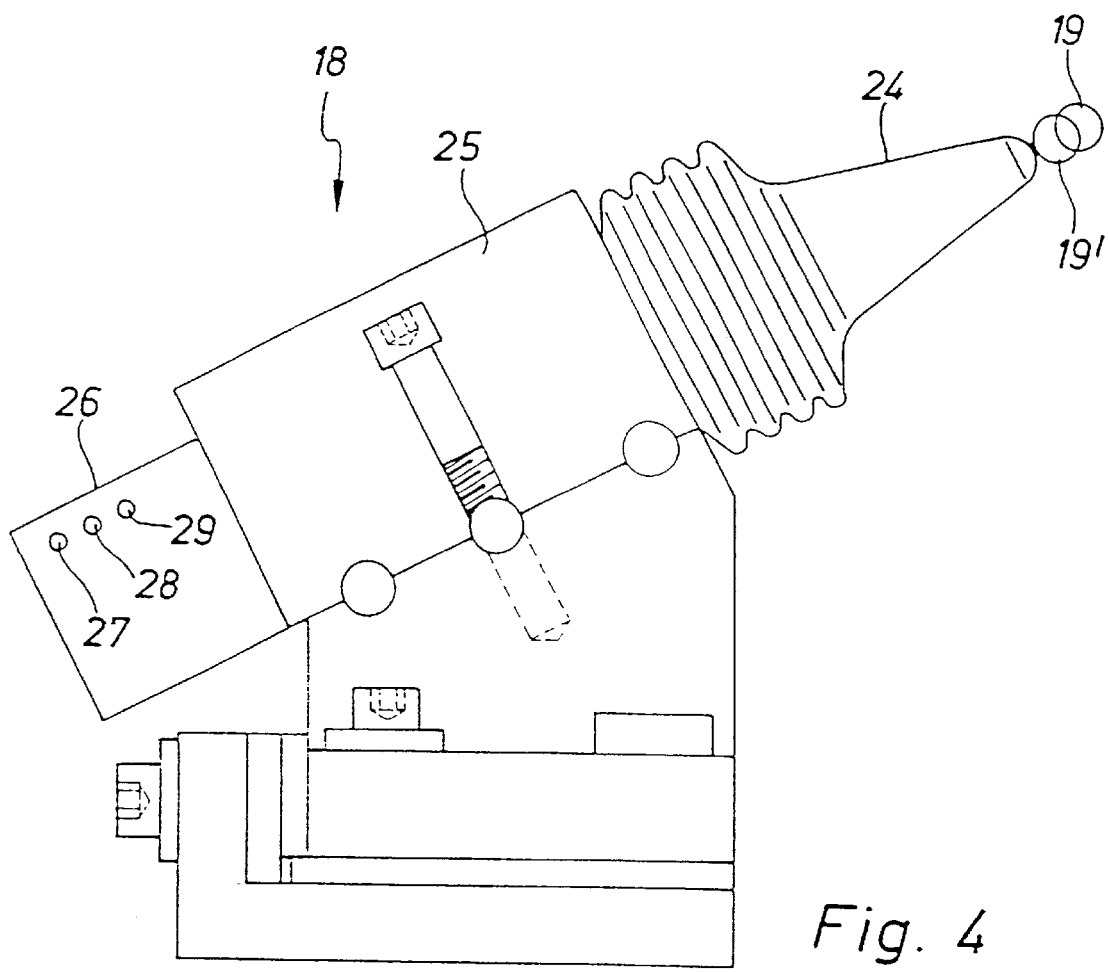
FIG. 4 is a side view of an embodiment of a holding part of the device according to the invention.

FIG. 4 shows another embodiment of a holding part 18 in which supporting element 19 is fastened to a plunger 24. Supporting element 19 in this embodiment has the shape of a sphere. In holding part 18, there is a spring (not shown) by which plunger 24 is extended out of housing 25. From this extended position, plunger 24 can be pushed inward into a set position so that supporting element 19 assumes the position designated 19'. In addition, a sensor is provided in housing 25 that detects the retracted position of plunger 24. At the end 26 opposite plunger 24, there are three LEDs 27 to 29 controlled by the sensor. Thus for example LED 28 shows the set position of plunger 24 and hence of supporting element 19, while LEDs 27 and 29 indicate admissible boundary values for position deviations of supporting element 19. In simple embodiments, only a single LED 28 may be provided. The reference signal generated by the sensor can also be used for the duration of the process. In particular, the automatic advance of clamping element 20 can be stopped by this signal. In addition this signal can be used in a joining process as a starting signal for the process.

Figure 5:
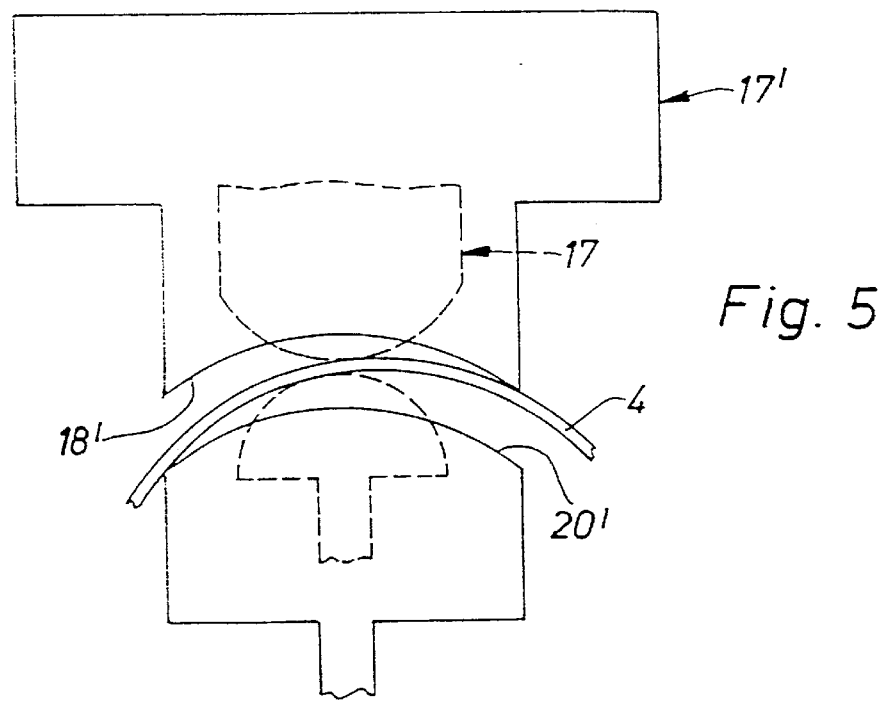
FIG. 5 is a schematic view of the tensioning of a shaped part according to the prior art and according to the invention.

FIG. 5 shows a tensioning element 17' according to the prior art in solid lines, and a tensioning element 17 according to the invention in broken lines. In the known clamping element 17', holding part 18' is shown as a negative (i.e., mating) form of molded part 4. This also applies to clamping element 20'. If shaped element 4 is pushed or twisted relative to its set position, retaining part 18' then no longer fits flush against shaped part 4 but contacts it for example at a point located outside the center. In addition, clamping element 20' abuts a point on shaped part 4 that does not correspond to the point of contact of retaining part 18'. If clamping element 20' moves in the direction of holding part 18', transverse forces and moments will be exerted on shaped part 4. If holding part 18, as provided in the invention, abuts the clamping location pointwise and a matching clamping element 20 is located opposite holding part 18, and the clamping forces act in the direction of the normal to the clamping position, no transverse forces and no moments will be introduced into shaped part 4 during tensioning.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of clamping a shaped body part for a motor vehicle at a single contact point on said shaped part, said method comprising the acts of:
   providing a tensioning device including a frame and a plurality of tensioning elements mounted on said frame, each of said tensioning elements having a holding part and a clamping element that presses the shaped part against the holding part, each of said holding part and said clamping element having a convex clamping surface for pointwise engagement with said shaped part at said contact point; and
   clamping said shaped part between said clamping element and said holding part of each of said tensioning elements, such that said clamping element presses the shaped part against the holding part.

2. The method according to claim 1, wherein said holding part and said clamping element are arranged such that a clamping force therebetween is directed normal to a surface of said shaped part.

3. A method according to claim 1, wherein said pointwise engagement by said convex clamping surfaces of said holding part and said clamping element secures the shaped part in only one dimension.

* * * * *